Oct. 15, 1946.  C. R. ROGERS ET AL  2,409,515
CLUTCH CONTROL
Filed Oct. 11, 1943  8 Sheets-Sheet 1

Fig. 1

Inventors:
Clifford R. Rogers,
William O. Bechman
and Joseph F. Ziskal,

By Paul O. Pippel.
Attorney.

Oct. 15, 1946.    C. R. ROGERS ET AL    2,409,515
CLUTCH CONTROL
Filed Oct. 11, 1943    8 Sheets-Sheet 5

Patented Oct. 15, 1946

2,409,515

UNITED STATES PATENT OFFICE 2,409,515

CLUTCH CONTROL

Clifford R. Rogers, Oak Park, William O. Bechman, Chicago, and Joseph F. Ziskal, Cicero, Ill., assignors to International Harvester Company, a corporation of New Jersey Application October 11, 1943, Serial No. 505,810

6 Claims. (Cl. 192—87)

This invention relates to a new and improved clutch control and has for one of its principal objects the provision of means for actuating a dual clutch with a single operating pedal.

More particularly, the present invention relates to a lever-shifting device operable by a pedal and capable of reversing its direction of movement by successive depressions of the single foot pedal.

An important object of this invention is to provide dual speed ranges for vehicles, such as tractors or the like, and means for shifting from one range to the other by operation of a single control. The invention further provides that this single control will operate to shift the speed range from one to the other regardless of which range may be engaged at the beginning.

Prior vehicles of this type incorporating two speed ranges have not been able to immediately shift from one range to another without first opening two or more control levers. It has been necessary to depress a clutch lever and also to shift some other lever to effect a shifting from one speed range to another speed range. In such devices the lever for shifting from one range to the other was generally capable of shifting in at least two directions, one for each of the speed ranges. It is an object of the present invention, therefore, to eliminate the speed-range shifting levers and incorporate them in a single clutch pedal, which is capable of entirely disengaging both clutches and also capable of engaging either clutch as may be desired.

A still further important object of this invention is the provision of power means supplementing the operation of a clutch control lever, which effects clutch operation quickly and easily with but minimum effort by the operator.

Other and further important objects will become apparent from the disclosures in the following specification and accompanying drawings, in which.

As shown in the drawings, the reference numeral 1 indicates generally an operator's cab section of a vehicle, such as a tractor or the like, and is equipped with a seat 2 in proximity to the engine and vehicle-operating foot pedals 3. The present invention relates only to clutch pedals, and for purposes of clearer understanding other pedals and apparatus have not been shown. A service clutch pedal 4 is provided and is capable of performing all the functions of a regular clutch pedal as well as the several additional functions, which it has taken on in the performance of the present invention.

Figure 1:
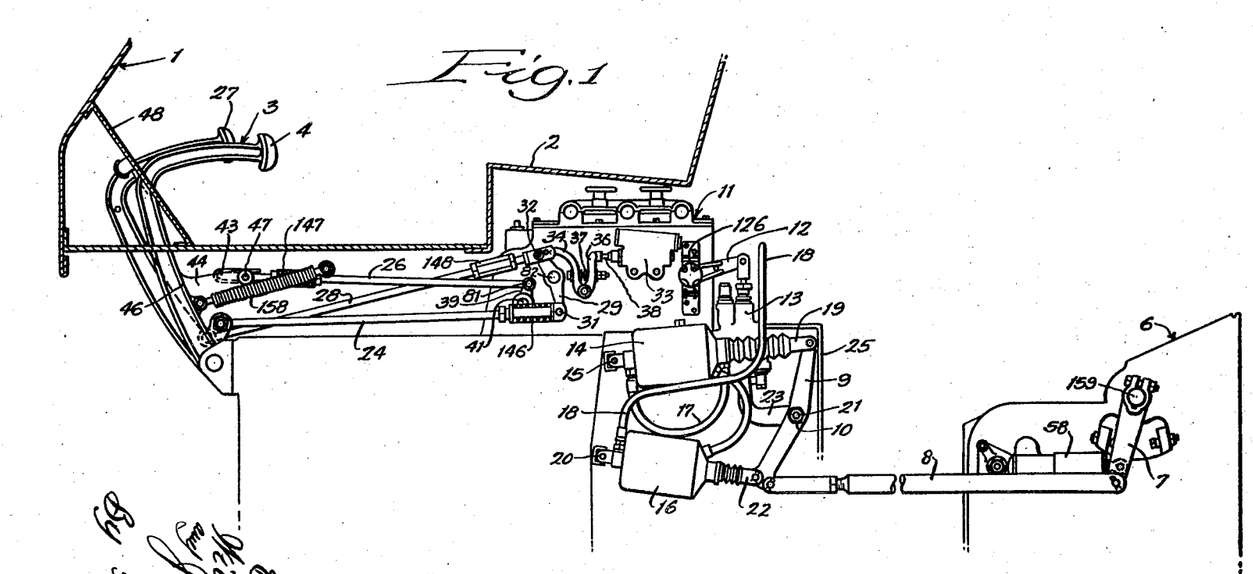
Figure 1 is a side elevation of the entire clutch control apparatus.
Figure 13:
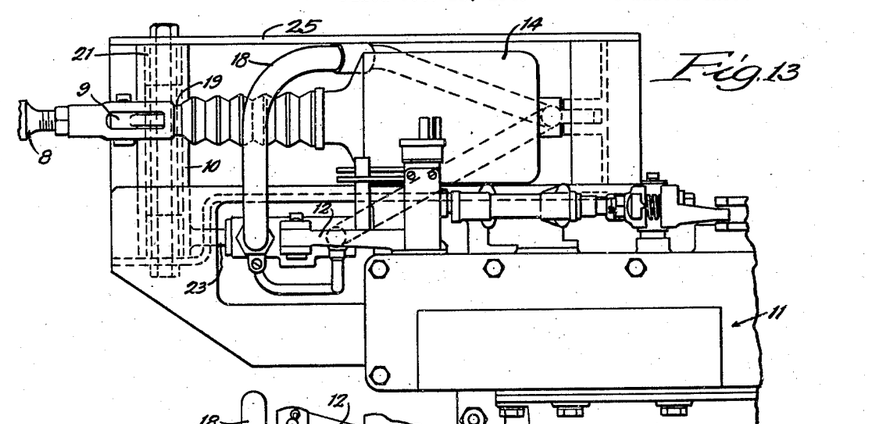
Figure 13 is a top plan view of the clutch control booster system as shown in Figure 1.
Figure 14:
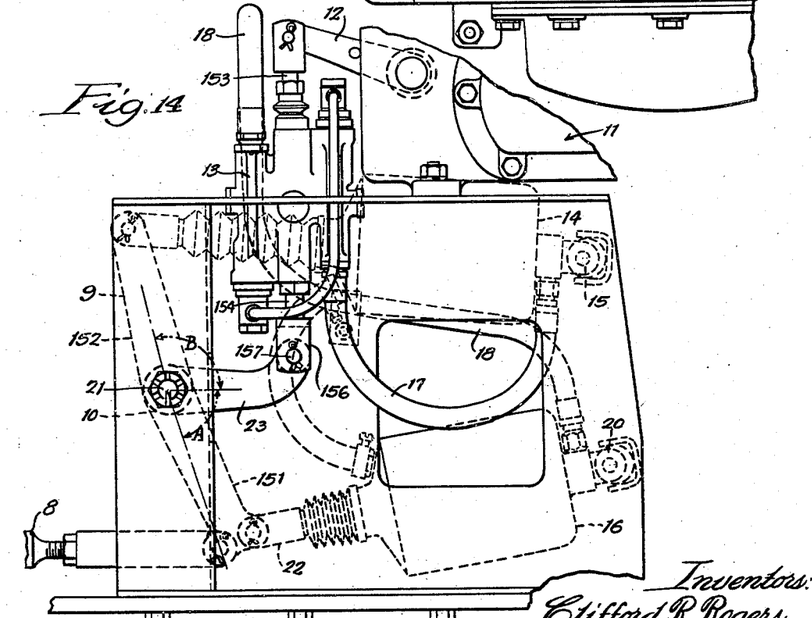
Figure 14 is a side elevation of the device as shown in Figure 13.
Figure 15:
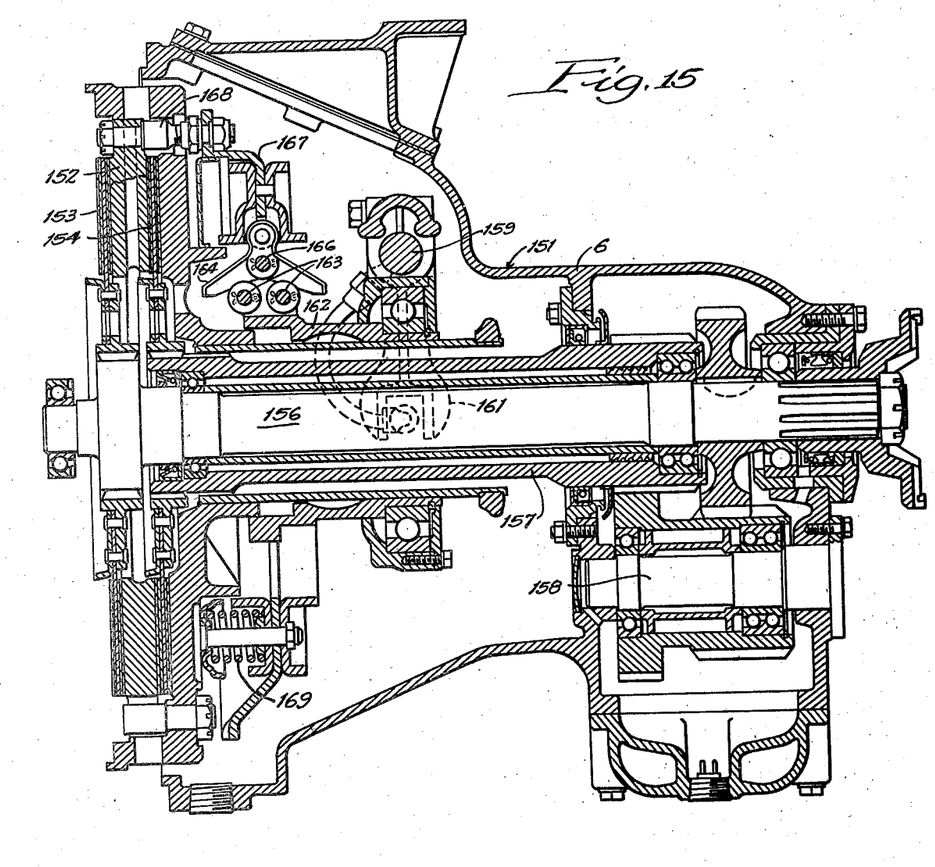
Figure 15 is a sectional view of the dual clutch used in this invention.

The tractor forming the subject of the present invention is equipped with a dual clutch 151 as shown in Figure 15, wherein a fly-wheel 152 is driven continuously by the engine (not shown) and by means of clutches 153 and 154 optionally drives a central shaft 156 or a superposed sleeve shaft 157. Associated with the sleeve shaft is a reduction gearing 158 capable of decreasing the speed and increasing the power output. The dual clutch of applicant's device is housed in a clutch casing 6, and the clutches are operated by means of a lever 7, which is moved by means of a connecting link 8 in turn operated by a rocker arm 9 closely associated with a clutch selector 11. The lever 7 is affixed to a shaft 159, which extends inwardly of the housing 6 as shown in Figure 15, and causes movement of a fork 161 which in turn shifts the sleeve 162 in either direction. Operating rollers 163 engage the under V-shaped side of a dual purpose lever 164. The lever 164 is pivoted at 166, and hence movement of the sleeve 162 and integral rollers 163 will effect a tilting of the lever 164 whereby linkage 167 attached to the fly-wheel pin 168 will frictionally engage either of the clutches 153 and 154 depending upon the direction in which the sleeve 162 is moved. The lever 164 is merely one of several which are spaced at intervals around the annular periphery of the clutches. In addition to causing movement of the linkage 167, the lever 164 acts to maintain the fly-wheel 152 in a neutral central position so that it engages neither of the clutches 153 and 154. Springs 169 aid in establishing the engagement and retention of engagement of the fly-wheel 152 with either of the clutch discs. The clutch selector 11 is actuated by the foot pedal 4, and, depending upon the operation of this pedal 4, a lever 12 is shifted in accordance therewith. It will be evident, therefore, that as the lever 12 is forced downwardly from the position, as shown, the lever 7 will swing in a rightward direction and cause a change in engagement of the dual clutches. The lever 12 is connected to a valve 13, which is in turn connected to a pair of fluid-actuated power cylinders 14 and 16 by means of conduits 17 and 18. The fluid-operated power cylinders 14 and 16 derive their power from compressed air or other fluid under pressure normally found in tractors of this type. The valve 13, therefore, is adapted to direct this source of fluid under pressure to either of the power cylinders 14 or 16, and upon directing it to one, to simultaneously exhaust the other. The power cylinders 14 and 16 are hinged at 15 and 20, respectively. The valve 13 may be any one of several standard makes, and as it forms no direct part of the present invention, it is not shown in greater detail. It will be seen that when the power cylinder 14 is supplied with fluid under pressure, as is the case in Figure 1 of the drawings, its piston rod 19 is extended and thereupon actuates the rocker arm 9 to pivot with its sleeve 10 about the central shaft 21 fixed in the housing 25 and thus pull the arm 8 forwardly toward the front of the vehicle. This last operation is permitted because of the exhausting of the power cylinder 16 and a withdrawing of he piston rod 22 within the cylinder 16. Conversely, when the lever 12 is forced downwardly, the valve then causes air under pressure to be admitted to the power cylinder 16 and exhaust the air under pressure from the power cylinder 14, thereupon extending the rod 22 and withdrawing the rod 19 so that the rocker arm 9 is forced in the opposite direction from that shown, and the connecting arm 8 is pushed in a rightward direction causing a shifting of the lever arm 7 and a change in the engagement of the operating clutches 153 and 154 with the fly-wheel 152. The valve 13, in addition to acting to direct fluid under pressure, is capable of acting as a positive link between the rocker arm 9 and the lever 12 by means of an angled lever 23, which is keyed to the sleeve shaft 10 at 30 and to the lower end of the valve 13, as best shown in Figures 13 and 14. Inasmuch as the angled lever 23 is keyed to the sleeve shaft 10 and the rocker arm 9 is also keyed to the sleeve shaft 10, the combination thereof forms a bell-crank. For purposes of clearer understanding, attention is called to the fixed angle "A" shown in Figure 14 between the angled lever 23 and the rocker arm 9. From this construction it is possible to rock the arm 9 by a mere raising and lowering of the lever arm 12 regardless of whether there is any compressed air or other fluid under pressure in the system.

A depression of the foot pedal 4 acts to pull rods 24 and 26 forwardly so that they in turn may actuate the clutch selector 11. An emergency pedal 27 is positioned adjacent the service pedal 4 and is only used upon failure of the compressed air used in the booster arrangement of power-operating cylinders 14 and 16. The emergency pedal 27 is attached to a connecting rod 28. The connecting arms 24 and 28 are attached to opposite ends of a bell-crank 29 at 31 and 32, respectively.

In order to enable the operator to shift his transmission gears more easily, a clutch brake, not shown, is supplied in the system and is operated by fluid under pressure obtained from a valve 33. The valve 33 is actuated by means of the bell-crank 29 through lever arms 34 and 36. The upper portion of the bell-crank 29 strikes the top portion of the arm 34, and movement of this arm 34 causes compression of a spring 37 positioned intermediate the arms 34 and 36, and such compression eventually causes a movement of the arm 36 similar to that of the arm 34 so that the valve plunger 38 is depressed. It is quite obvious that a depressing of the clutch service pedal 4 will act to operate this valve 33, and as the valve acts to brake the moving parts, shifting of the gears is made possible with a minimum of effort on the part of the operator.

Figure 2:
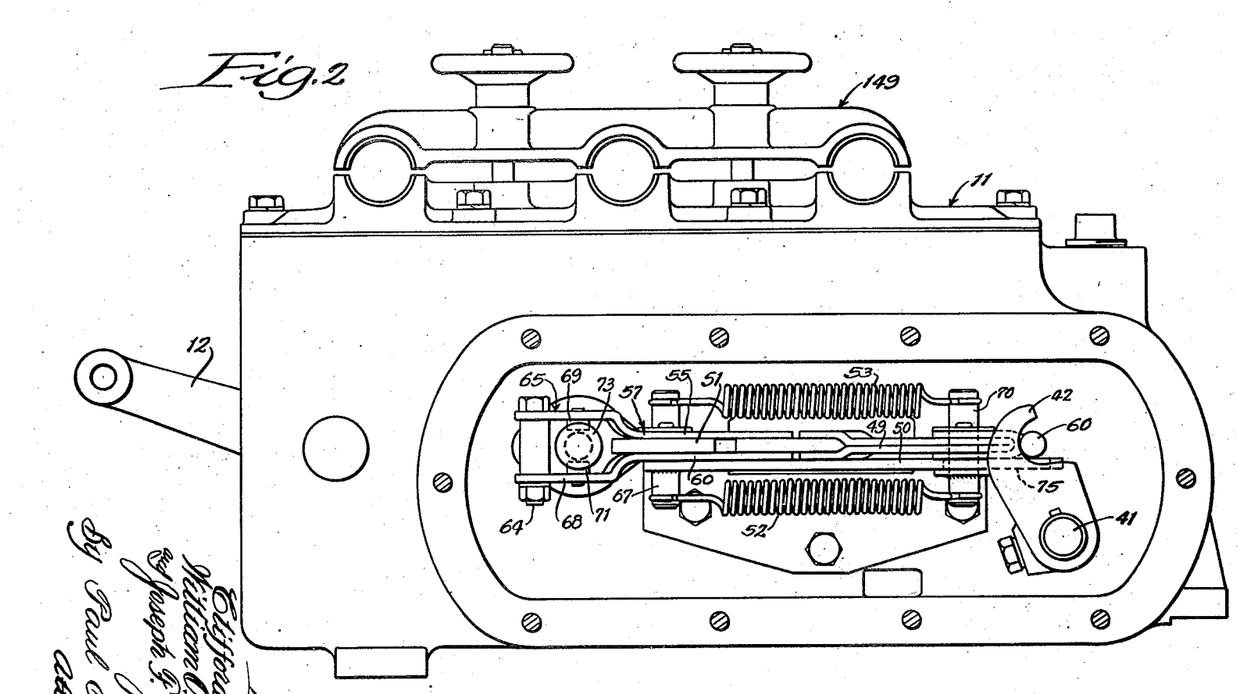
Figure 2 is a side elevation of the clutch selector.
Figure 3:
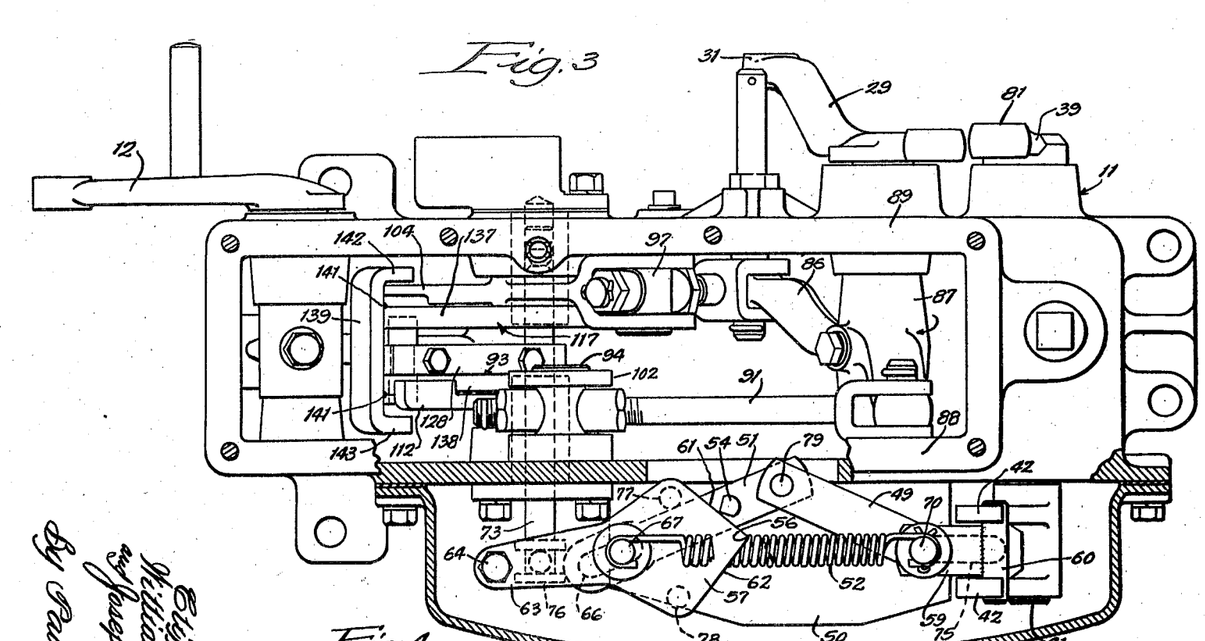
Figure 3 is a top plan view of the clutch selector.
Figure 4:
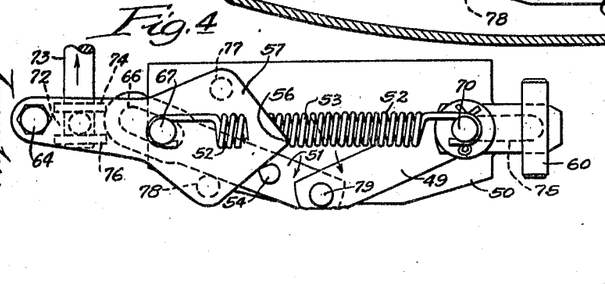
Figure 4 shows a partial view of the device as shown in Figure 2 in a shifted position.

The connecting arm 26, between the service pedal 4 and the clutch selector 11, is connected to a small lever arm 39 on the side of the selector unit 11. This arm 39 is in turn fixed to a shaft 41 which drives through to the opposite side of the selector 11 and acts to operate the hook-type toggle lever arm 42. As will be seen from Figure 1, forward movement of the connecting arm 26 is delayed by reason of the elongated slot 43 in its forward end thereof. An extension 44 is affixed to the service pedal 4 at 46 and at the forward end is equipped with a stub shaft 47 adapted to slide in the slot 43. It is quite evident from this particular construction the pedal 4 may be depressed fully half of its distance to the floor-board 48 before the stub shaft 47 strikes the end of the slot 43. At this point, that is, when the pedal 4 is depressed half way to the floor-board 48, the remaining depression of the pedal 4 to the floor-board 48 will cause the arm 26 to be pulled forwardly, thus rotating the shaft 41. As best shown in Figure 2, rotation of the shaft 41 causes a similar rotation of the hook member 42 and acts to extend the toggle lever arms 49 and 51, supported by the plate member 50, which are maintained in substantially collapsed position by reason of the springs 52 and 53 extending therebetween. Figures 3 and 4 show a top view of the toggle arms 49 and 51, and upon extending these arms 49 and 51 by reason of full depression of the service pedal 4 for concurrent movement of connecting arm 26, lever 39, shaft 41, and hook member 42, a stub projection 54 rides over the apex 56 of a cam member 57. A releasing of the pedal 4 thereupon permits the springs 52 and 53 to again compress the lever arms 49 and 51, but inasmuch as the projection 54 is now on the other side of the center-point 56, the arms 49 and 51 will compress in the opposite direction, as best shown in Figure 4.

The purpose of the clutch selector 11 is to shift the lever arm 12 so as to operate either of the dual clutches 153 and 154 by shifting of the lever 7 through appropriate linkage and power booster apparatus in the form of compressed air cylinders 14 and 16. A shock absorber 58 is associated with the lever arm 7 and prohibits its rapid movement in either direction so that movement of the lever 12, regardless of how fast it may be, will always effect a smooth, easy movement of the lever 7. As previously stated, the dual clutch has two speed ranges, and engagement of one of the clutches 153 operates one range or direct drive, and engagement of the other clutch 154 operates the other speed range or indirect drive through the reduction gearing 158, so that a shifting of the lever 12 and a corresponding shifting of the lever 7 through its full range will effect a shifting from one speed range to the other speed range. The service pedal operates to disengage both clutches upon a depression to a point midway of its normal position and the floor-board 48 at which point the lever 7 is in a substantially vertical position and fork 161 is in position as shown in Figure 15, and a full movement of the service pedal 4 to the floor-board 48 will effect a shifting from one speed range to the other speed range regardless of which speed range is in operation at the beginning of the depression. A regular transmission is supplied in conjunction with the two-speed clutch, and the two speeds in the clutch system permit exactly double range of gear ratios that may be attained by reason of the transmission shifting. Shifting of transmission gears is in all respects similar to any vehicle with the exception that the clutch pedal 4 is not fully depressed as in the ordinary clutch pedal but is only depressed half way, in which position the clutches are not engaging either clutch speed drive. In this position the transmission gears may be shifted without a driving force being upon them, and in cooperation with the clutch brake as operated by the valve 33, the transmission may be of the most simple form and will not require complicated synchromesh elements.

Figure 11:
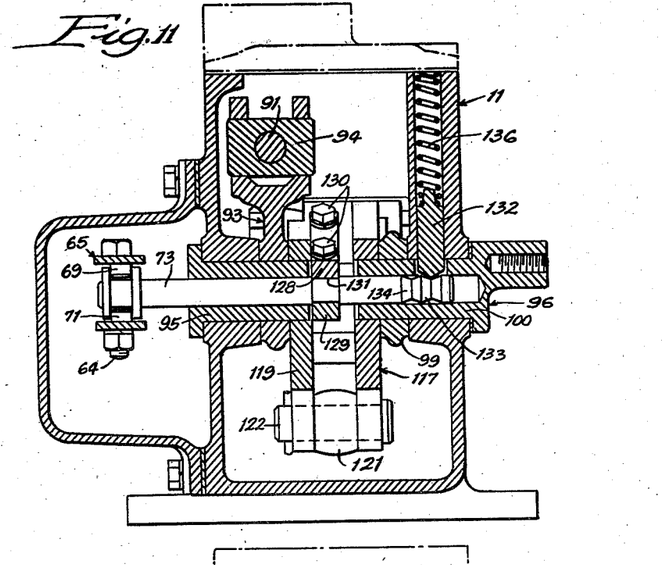
Figure 11 is a sectional view taken on the line 11—11 of Figure 5.
Figure 12:
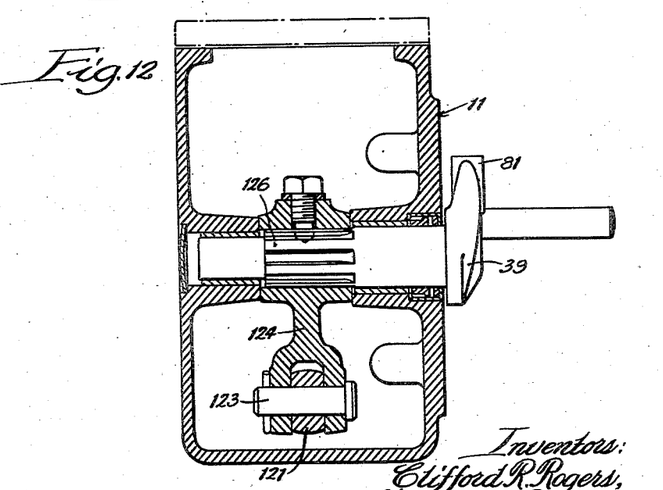
Figure 12 is a sectional view taken on the line 12—12 of Figure 5.

Returning now to Figures 2, 3, and 4, it will be evident that upon the full depression of the service pedal 4, the toggle hook member 42 will cause extension of the levers 49 and 51 by reason of its pulling on the shaft 60 welded, or otherwise attached, to the interconnecting member 59 positioned intermediate the end of the lever 49 and the hook member 42. The cam member 57 has an apex 56, as previously stated, and is the intersection of a substantially right angle for the side surfaces 61 and 62, respectively. The cam 57 is pivoted at 67 on a fixed point of the plate 50. This toggle 57 includes upper and lower spaced apart elements 55 and 60 between which the lever 51 moves. The end of the toggle 57 is spread in a fork-like extension, as shown at 65, and terminates in an end 64 which prevents spreading or contracting. The toggle arm 51 is supplied with an elongated slot 66 in its end and is adapted to receive the pin member 67 for sliding movement therein. The pin member 67 has extensions for supporting the ends of the springs 52 and 53. As best shown in Figures 2 and 11, the cam member 57 has a fork-like extension 68 at its rear and acts to support opposed pins 69 and 71, which engage an annular groove 72 formed in a shaft 73 by means of spaced apart annular flanges 74 and 76. Therefore, upon movement of the cam 57, a corresponding movement will take place in the shaft 73. Projecting stops 77 and 78 are applied on the underside of the cam member 57 and act to limit movement of the toggle arm 51 in either of its range of movements. As shown in Figure 3, the projection 54 on the toggle arm 51 is riding on the surface 61 of the cam 57 and a full depression of the service clutch pedal 4 will cause an extension of the toggle arm 49 and 51 to a straight angle between the arms at their intersection at 79. Inasmuch as the apex 56 of the cam 57 is off-center with respect to an imaginary line drawn between the spring pins 67 and 70, the stop projection 54 will now be sliding on the surface 62 of the cam member 57, and a release of the pedal will bring about a condition as shown in Figure 4, upon the toggle arm 51 sliding down at the side 62 of the cam member 57 and eventually striking the stop 78. Continued collapsing or compressing of the toggle arms 49 and 51 causes concurrent movement of the cam member 57 about its pivot 67 so that the shaft 73 is forced inwardly, viewing the device from Figure 2 of the drawings. It will be understood, of course, that these toggle arms 49 and 51 are not in operation until such time as the service clutch pedal 4 is depressed beyond its half-way mark and at that time they begin operation. The toggle lever arm 49 has the spring-holding pin 70 affixed through its end portion and upon an extension of the levers 49 and 51 the pin slides in the slots 75 in the supporting plate 50.

Figure 5:
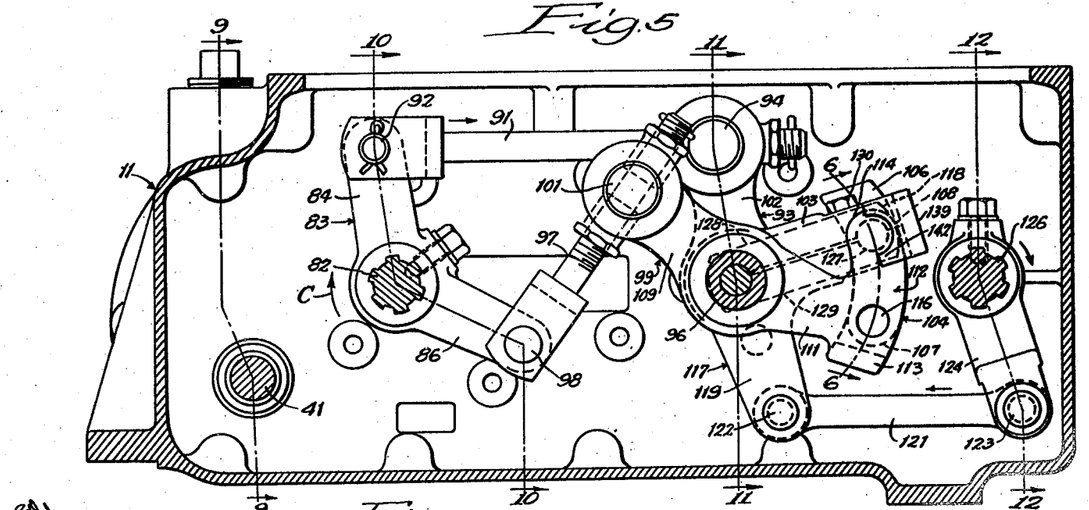
Figure 5 is a side elevation of the device as shown in Figure 2.

As shown in Figures 3 and 5, the connecting links 24 and 26, between the service pedal 4 and the clutch selector 11, join the bell-crank 29 at 31 and the arm 39 at 81, respectively. As previously stated, the operation of the arm 39 causes rotation of the shaft 41, which extends from the one side of the clutch selector to the other, as best shown in Figure 3. Operation of the rocker arm 29 in contradistinction to the operation of the arm 39 begins operation immediately upon any depression of the service clutch pedal 4 and causes rotation of a shaft 82 within the clutch selector 11. A bell-crank 83 is splined or otherwise keyed to the shaft 82, and upon rotation thereof causes movement of its extending arms 84 and 86. A hub portion 87 of this bell-crank 83 acts as a spacer between the casing side walls 88 and 89 of the selector 11 and prevents undesirable shifting of the bell-crank 83 longitudinally of the shaft 82 which is rotated by the outwardly mounted bell-crank 29 of the clutch selector 11. The outer end of the arm 84 of the bell-crank 83 attaches to a connecting arm 91 at 92, and the connecting link 91 is attached at its other end to a bell-crank 93 at 94. The bell-crank 93 is pivoted on a bearing sleeve shaft 96 composed of sections 95 and 100 as best shown in Figure 11. The other arm 86 of the bell-crank 83 attaches to a connecting link 97 at 98. The other end of this connecting link 97 adjoins a bell-crank 99 at 101. This latter bell-crank 99 is pivoted on the section 100 of the bearing sleeve 96.

Figure 9:
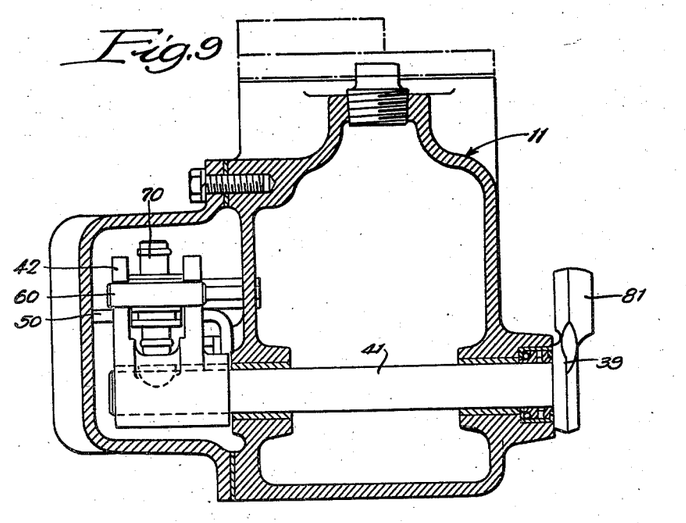
Figure 9 is a sectional view taken on the line 9—9 of Figure 5.

Figure 9 is a transverse sectional view taken along the shaft 41 and clearly shows the connection between the lever arm 39 and the toggle hook member 42 on the far side of the clutch selector 11.

Figure 10:
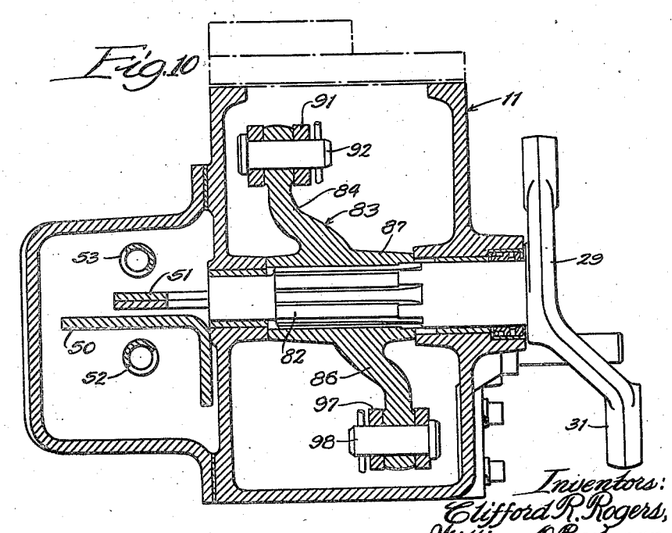
Figure 10 is a sectional view taken on the line 10—10 of Figure 5.

Figure 10 is a further transverse sectional view of the clutch selector 11 and is taken through the bell-crank 83 and shows connections 92 and 98 with connecting links 91 and 97, respectively.

Figure 11 is a further transverse sectional view through the clutch selector 11 and is taken through the bell-crank 93 and shows the connection 94 between the link 91 and the bell-crank 93. The plan view shape of the bell-crank 93 can best be followed in Figure 5, wherein it shows that there is an upper arm 102 and an arm 103 extending at slightly less than a right angle thereto. This arm 103 of the bell-crank 93 supports an alinement bracket 104, which has an inwardly extending upper flange 106 and a rounded lower end 107. A hole 108 is positioned in the bracket 104 near its upper end thereof. The shape and arrangement of the flange and aperture 106 and 108, respectively, is better shown in arcuate sectional views, 6, 7, and 8.

The second bell-crank 99 on the shaft 96 is also equipped with a substantially upwardly extending arm 109 and a lower extension 111, which is slightly less than a straight angle with respect to the upper arm 109. The lower arm 111 is similarly equipped with an alinement bracket 112, which has a lower flange 113 and an upper rounded portion 114 and includes an aperture 116, all fully shown in Figures 6, 7, and 8.

Figures 6, 8:
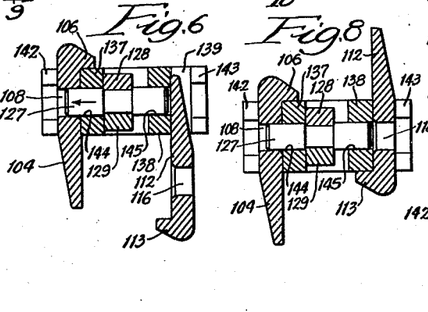
Figure 6 is a sectional view taken on the line 6—6 of Figure 5.
Figure 8 is a sectional view similar to Figures 6 and 7 with the clutch selector in neutral position.
Figure 7:
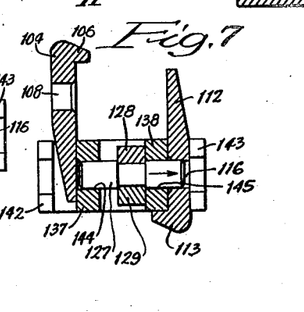
Figure 7 is a sectional view similar to Figure 6 with the device in shifted position.

As will be noticed in Figures 6, 7, and 8, the alinement brackets 104 and 112 are spaced at a considerable distance apart, and a third bell-crank 117 is positioned therebetween and on the shaft 96. The bell-crank 117 is equipped with an arm 118 positioned centrally of the alinement brackets 104 and 112 and a depending arm 119. The lower end of the arm 119 engages a connecting link 121 at 122. The connecting link 121 is attached at 123 to the lever arm 124, which is in turn keyed, splined, or otherwise attached, to a shaft 126, upon which is mounted the operating lever 12, previously described as in connection with Figures 1 and 3.

The fork-like arm 118 of the bell-crank 117 is additionally shown in Figure 11 and has a clamp therebetween. A pilot shaft 127 is rigidly held between upper and lower members 128 and 129, respectively. As shown in Figures 5 and 6, the shaft 127 is shown in its leftward position and engaging the aperture 108 in the alinement bracket 104. Figure 11 additionally shows the shaft 73 shifted by means of the cam 57, as previously described. The bell-crank 117 superposes this shaft 73 and shows the upper and lower members 128 and 129 attached by means of suitable bolts or the like 130. It will be seen that a shifting of the shaft 73 will cause a simultaneous shifting of the clamp members 128 and 129 inasmuch as they are mounted in an annular recess 131 in the shaft 73. Movement of the shaft 73 is restrained by reason of a spring-pressed detent 132 engaging notches 133 or 134 in the shaft 73. A spring 136 acts to force the plunger 132 into the slots 133 or 134. The engaging angle of the lower end of the detent 132 and the angle of the slots 133 and 134 are relatively small and a great force is not required to cause shifting of the shaft 73, but the shaft 73 is prevented from unwarranted wobbling or shifting except when desired.

As best shown in Figure 3, the bell-crank 117 has spaced arms 137 and 138 which enclose the clamp arm 128 and support a T-head 139 welded to the ends thereof, as shown at 141. The T-head 139 has downwardly depending end portions 142 and 143, which prevent excessive lateral shifting of the alinement arms 104 and 112.

In operation, the tractor or other vehicle is preferably started in the low speed range, or with clutch 154 in operation, and we, therefore, assume that the shaft 73 is in its proper position to effect such low speed range engagement. In such position the shaft 73 has its notch 133 engaged by the detent 132, and also in such position the clamp members 128 and 129 are in their extreme leftward position, as shown in Figure 11. In this position, the pilot shaft 127 is also in its extreme leftward position, as specifically shown in Figure 6. As shown in this Figure 6, the shaft 127 engages the aperture 108 in the alinement arm 104 as well as engaging the apertures 144 and 145 in the members 137 and 138, respectively, which are an integral part of the bell-crank 117. It will be noticed that the right end of the pilot shaft 127 is not engaging the alinement arm 112, but rather is separate from this arm 112. As the service clutch pedal 4 is depressed, the bell-crank 29 is directly rotated by means of the connecting link 24. This causes immediate rotation of the shaft 82 and a similar rotation of the bell-crank 83 mounted internally of the clutch selector 11. Rotation of this bell-crank 83 in a clockwise direction as viewed in Figure 5, and indicated by the arrow C, causes a rightward movement of the connecting link 91 and a similar movement of the upper arm 102 of the bell-crank 93. Such movement causes the bell-crank 93 to move in a clockwise direction about its supporting shaft 96, whereupon its lower extension 103, supporting the alinement arm 104, moves downwardly, and by reason of the shaft 127 engaging both bell-cranks 93 and 117, clockwise rotation of the bell-crank is imparted to the bell-crank 117 is shifted leftwardly, thus pulling the connecting link 121 in a similar direction and also the lever arm 124, which is keyed to the shaft 126. It will thus be seen that clockwise rotation is given to this shaft 126. It will be remembered that the shaft 126 supports the actuating lever 12, and it thus moves the arm 12 downwardly as viewed in Figure 1. This downward movement of the lever 12 actuates the control valve 13, effecting operation of one of the power cylinders 14 or 16, thus shifting the rocker arm 9 and thereupon the lever arm 7 through the connecting link 8. Such operation causes both the dual clutches 153 and 154 to be disengaged, and the device is in condition for manual shifting of the transmission gears. Release of the pedal 4 from its half depressed position will cause a reengagement of the same clutch 154 that was engaged at the time the service clutch pedal was initially depressed. Assuming now that we are in either second or third speed of the regular transmission speeds, and we desire to shift the clutch speed to a direct drive, it is merely necessary to depress the service clutch pedal all the way to the floorboard 48 at which time the connecting link 26 will be actuated and will in turn act to shift the toggle lever arms 49 and 51 from the position shown in Figure 3 to the position shown in Figure 4. As previously stated, this has caused the cam member 57 to shift downwardly so that its apex 56 is at a point below the center line between the end mountings of the lever arms 49 and 51. Shifting of this cam 57 is, of course, caused by the engagement of the arm 51 with the projection 78 on the cam 57. Shifting of this cam 57 also causes a similar shifting of the shaft 73, which determines which one of the bell-cranks, 93 or 99, will be the controlling factor in operating the bell-crank 117. The position of the shaft 73 after its shifting, as shown in Figure 4, will cause engagement of the detent 132 with the notch 134 rather than notch 133, as shown in Figure 11. Such shifting of the shaft 73 causes a similar shifting of the clamping members 128 and 129 by reason of their engagement in the annular recess 121 in this shaft 73. In the shifted position, the clamping members 128 and 129 will move rightwardly and engage the right arm of the bell-crank 117, as shown in Figure 11. Such shifting of the clamping members 128 and 129 causes a like shifting of its supported pilot shaft 127, which thereupon disengages the alinement member 104 and engages the alinement member 112, as shown in Figure 7. In such position a depression of the service clutch pedal 4 will cause rotation of the shaft 82 in a clockwise direction and will effect a downward movement of the connecting arm 97 and hence will cause the bell-crank 99 to move in a counter-clockwise direction about its supporting shaft 96 as viewed in Figure 5, and inasmuch as the alinement member 112, which is a part of the arm 111 of the bell-crank 99, is now engaged by the shaft 127, it will be evident that movement of the bell-crank 99 will control movement of the bell-crank 117 so that this time the depending arm 119, connecting link 121, and lever arm 124 will all move in a rightward direction as shown in Figure 5. The resultant rotation supplied to the shaft 126 is now counter-clockwise as distinguished from the clockwise direction that it had when its rotation was obtained from the bell-crank 93. Therefore, the lever arm 12 is shifted upwardly and effects an opposite movement of the lever arm 7 and an engagement of the other of the dual clutches 153 of this device. Following through with the driving operation, it will be understood that we now are driving directly through the clutch 153, and the speed of the vehicle increases. While in this high speed range of the clutch, it is possible to shift in any of the regular transmission gear speeds by merely depressing the service clutch pedal 4 to its half-way position to the floor-board 48. It will be understood that regardless of which clutch speed range is in operation, a full depression of the service clutch pedal will cause the clutch speed range to change. This is true because the cam member 57, upon each shift, has its vertex 56 shifted to either one side or the other of the center line drawn between the spring retaining shafts 67 and 70. This shifting causes the projection 54 to ride overcenter every time the lever arms 49 and 51 are extended by reason of movement of the hook 42 upon operation of the connecting arm 26. After each overriding of the center 56 by the stub projection 54, the lever arm 51 will ride down the opposite side of the cam 57 so that regardless of its initial position the cam 57 will shift in an opposite direction so that the shaft 73 will reciprocate.

Depression of the pedal 4 causes rotation of the bell-crank 83 and a simultaneous shifting of the connecting arms 91 and 97 so that both bell-cranks 93 and 99 shift regardless of which one is engaging the bell-crank 117. Initial depression of the foot pedal 4 causes the bell-cranks and their associated alinement members 104 and 112 to assume the position shown in Figure 8, wherein the flanges 106 and 113 engage the members 137 and 138, respectively, and upon such engagement, both apertures 108 and 116 are axially alined with the shaft 127. In this position the shaft may be shifted upon continued depression of the foot pedal 4 and operation of the toggle levers 49 and 51 to effect movement of the cam 57. However, if the clutch pedal 4 is not depressed the remaining half distance to the floor-board 48, the pilot shaft 127 will remain engaged with the alinement member 104 or 112 with which it was engaged previous to any depressing of the pedal 4.

When the compressed air or fluid pressure of the vehicles fails, and it is desired to make changes in the transmission gearing, this is possible by utilizing the valve 13 as a solid link between the rocker arm 9 and the lever 12. As best shown in Figures 13 and 14, the rocker arm 9 and lever arm 23 are keyed to the shaft 21 on the pivot point 10 so that the lever arm 23 and legs 151 and 152 of the rocker arm 9 form fixed bell-cranks defined by the fixed angle A between the arms 23 and 152. The valve 13 has an operating valve stem 153 vertically reciprocable through a small range of movement. It will be apparent that when the lever 12 either lowers or lifts the valve operating stem 153 to either of its limiting positions, further movement of the lever 12 will cause a shifting of the entire valve body 13. This valve 13 is equipped with a depending member 154 terminating in a fork 156 between which is mounted the end of the lever arm 23 pivoted thereto by means of the shaft 157. During ordinary operation of this clutch selector, movement of the lever 12 will cause the valve 13 to direct air under pressure to either one of the cylinders 14 or 16, whereupon the cylinder receiving the compressed air will have its piston extended and thus rock the rocker arm 9 about its pivot 21. Upon release of the service clutch pedal 4, the spring 158 will act to return it to its normal upward position with respect to the floorboard 48. Upward movement of the service clutch pedal 4 will cause a counter-clockwise movement of the shaft 82 and an opposite movement of the lever 12. Such movement of the lever 12 will cause the valve 13 to actuate one of the power cylinders 14 or 16 and shift the lever 7 to enage either plate of the dual plate clutches 153 or 154. The force required to shift the friction clutch plates into and out of engagement is great, as it must overcome the direct forces of the large springs 169, and it is, therefore, necessary to use the compressed air booster in both directions of clutch movement, that is, in engaging or disengaging. The spring 158 is not strong enough to actuate the clutch but is sufficiently strong to operate the lever 12. Hence, when the air pressure is not operating, and the service pedal 4 has been depressed for shifting purposes, it is necessary to operate the emergency pedal 27 to raise the service pedal 4 inasmuch as depression of the emergency pedal 7 causes counter-clockwise movement of the rocker arm 29 about its shaft 82, as viewed in Figure 1. From this description it will be evident that it is possible to shift clutch ranges entirely by manual operation without the aid of the booster system or merely to shift transmission gears upon a half-way depression of the service pedal 4. In both instances, the service clutch pedal is raised by depressing the emergency pedal 27.

Overrunning spring units are supplied in the connecting arms 24 and 26, between the pedals 4 and 27 and the clutch selector 11 at 146 and 147. The spring unit 147 is for the purpose of permitting tolerance in adjusting the length of the slot 43. The spring unit 146 comes into play during the last half of the depression of pedal 4. During that movement, it is required that the rocker arm 29 remain in its position as fixed by the first half of the depression of the pedal 4, and, therefore, inasmuch as the connecting arm 24 continues to move through full depression of the pedal 4, the spring 146 will be compressed. It will be understood that the spring is under a sufficient initial load to cause the arm 24 to act as a solid link between the pedal 4 and the rocker arm 29 during the first half depression of the pedal 4. During the last half of the pedal depression the spring 146 compresses and the rocker arm 29 remains in neutral while the range shifter comes into operation. If the compressed air or other power fails, then it requires much more force to bring the clutch selector into neutral position, and therefore, the initial load of the spring 146 is overcome during the first half of the depression of the pedal 4 and neutral position of the clutch selector is not reached until full depression of the pedal 4. At such time the range of the clutch has also been changed, but this is not detrimental to the tractor operation.

The connecting arm 28 between the emergency pedal 28 and rocker arm 29 is provided with a means for adjusting, as shown at 148. Operation of this turnbuckle adjusting means 148 will vary the length of the connecting link 28.

The top of the clutch selector unit 11 is equipped with a clamping device 149 to enable electrical cables or the like to be firmly held in the vehicle. This, however, performs no function of the present invention.

Numerous details of construction may be varied throughout a wide range, but it is not the purpose of this invention to limit the patent granted hereon otherwise than as necessitated by the appended claims.

What is claimed is:

1. In a vehicle having dual clutches and actuating means therefor comprising an operating pedal, a clutch selector, said actuating means capable of effecting alternate engagement of either clutch upon successive depressions of said operating pedal, said clutch selector comprising a pair of shafts adapted to be successively rotated by the operating pedal, one of said shafts having a bell-crank lever keyed thereto, a pair of levers joined to opposite ends of said bell-crank lever, a third shaft, and a bell-crank lever keyed to said third shaft, the other of said pair of shafts operating means to cause interlocking of either of said levers to the bell-crank on the third shaft, whereby said third shaft has motion in either direction of rotation depending on which lever is locked to the bell-crank on the third shaft.

2. In a vehicle having dual clutches and actuating means therefor comprising an operating pedal, a clutch selector, said actuating means capable of effecting alternate engagement of either clutch upon successive depressions of said operating pedal, said clutch selector comprising a pair of shafts adapted to be successively rotated by the operating pedal, one of said shafts having a bell-crank lever keyed thereto, a pair of levers joined to opposite ends of said bell-crank lever, a third shaft, and a bell-crank lever keyed to said third shaft, the other of said pair of shafts operating means to cause interlocking of either of said levers to the bell-crank on the third shaft, whereby said third shaft has motion in either direction of rotation depending on which lever is locked to the bell-crank on the third shaft, said means to cause interlocking comprising a toggle mechanism.

3. In a vehicle having dual clutches and actuating means therefor comprising an operating pedal, a clutch selector, means interposed between said selector and the dual clutches for engaging either of said clutches, said actuating means capable of effecting alternate engagement of either clutch upon successive depressions of said operating pedal, said clutch selector comprising a pair of shafts adapted to be successively rotated by the operating pedal, one of said shafts having a bell-crank lever keyed thereto, a pair of levers joined to opposite ends of said bell-crank lever, a third shaft, and a bell-crank lever keyed to said third shaft, the other of said pair of shafts operating means to cause interlocking of either of said levers to the bell-crank on the third shaft, whereby said third shaft has motion in either direction of rotation depending on which lever is locked to the bell-crank on the third shaft, said means to cause interlocking comprising a toggle mechanism having a pivotable cam toggle with an apex, a pair of hinged toggle arms, a spring for normally compressing said toggle arms, a projection on one of said toggle arms for engaging one end of said cam toggle, projections on opposite sides of said cam toggle engageable by said toggle arm having the projection to cause pivoting of the cam toggle, and a reciprocable shaft moved by the opposite end of said cam toggle, said reciprocable shaft carrying a locking pin to alternately engage one or the other of said levers with the bell-crank on the third shaft and an extension of said toggle arms by the rotation of the other of said pair of shafts by depression of the operating pedal causing said projection on said toggle arm to move past the apex on the cam toggle and a subsequent release of said operating pedal and a concurrent release of the other of said pair of shafts permitting said spring to compress said toggle arms in the opposite direction as the projection on said arm rides down the opposite side of the cam toggle, whereupon said toggle arm strikes one of the projections on said cam toggle and causes it to pivot and so shift the shaft carrying the locking pin to engage the opposite lever with the bell-crank from the one initially engaged.

4. In a vehicle having dual clutches and actuating means therefor comprising an operating pedal, a clutch selector, said actuating means capable of effecting alternate engagement of either clutch upon successive depressions of said operating pedal, said clutch selector comprising a pair of shafts adapted to be successively rotated by the operating pedal, a crank on each of said shafts and a connecting rod between each crank and the operating pedal, one of said shafts and a connecting rod between each crank and the operating pedal, one of said connecting rods having a lost motion means therein and the other of said connecting rods having an overrunning spring means therein.

5. In a vehicle having dual clutches and actuating means therefor comprising an operating pedal, a clutch selector, means interposed between said selector and the dual clutches for engaging either of said clutches, said actuating means capable of effecting alternate engagement of either clutch upon successive depressions of said operating pedal, said clutch selector comprising a plurality of levers and means for interlocking a predetermined group of said levers whereby movement of the operating pedal through its full range of travel will automatically cause another group of said levers to be interlocked, said means for interlocking a predetermined group of levers comprising a toggle mechanism spring compressed to one side and adapted to be extended to a straight angle upon depression of the operating pedal and upon release of said pedal to have said toggle mechanism compressed to the other side, and said means interposed between said selector and the dual clutches comprising an auxiliary power supply, a valve, and a pair of power cylinders, whereby operation of the selector will operate said valve and effect operation of either of said power cylinders depending on the direction of movement of the selector.

6. In a vehicle having dual clutches and actuating means therefor comprising an operating pedal, a clutch selector, means interposed between said selector and the dual clutches for engaging either of said clutches, said actuaing means capable of effecting alternate engagement of either clutch upon successive depressions of said operating pedal, said clutch selector comprising a pair of shafts adapted to be successively rotated by the operating pedal, one of said shafts having a bell-crank lever keyed thereto, a pair of levers joined to opposite ends of said bell-crank lever, a third shaft, a bell-crank lever keyed to said third shaft, the other of said pair of shafts operating means to cause interlocking of either of said levers to the bell-crank on the third shaft, whereby said third shaft has motion in either direction of rotation depending on which lever is locked to the bell-crank on the third shaft, said means to cause interlocking comprising a toggle mechanism having a pivotable cam toggle with an apex, a pair of hinged toggle arms, a spring for normally compressing said toggle arms, a projection on one of said toggle arms for engaging one end of said cam toggle, projections on opposite sides of said cam toggle engageable by said toggle arm having the projection to cause pivoting of the cam toggle, and a reciprocable shaft moved by the opposite end of said cam toggle, said reciprocable shaft carrying a locking pin to alternately engage one or the other of said levers with the bell-crank on the third shaft and an extension of said toggle arms by the rotation of the other of said pair of shafts by depression of the operating pedal causing said projection on said toggle arm to move past the apex on the cam toggle and a subsequent release of said operating pedal and a concurrent release of the other of said pair of shafts permitting said spring to compress said toggle arms in the opposite direction as the projection on said arm rides down the opposite side of the cam toggle, whereupon said toggle arm strikes one of the projections on said cam toggle and causes it to pivot and so shift the shaft carrying the locking pin to engage the opposite lever with the bell-crank from the one initially engaged, said means interposed between said selector and the dual clutches comprising an auxiliary power supply, a valve, a pair of power cylinders adapted to be singly actuated by said valve, a rocker arm adjoining said power cylinder, and an angled lever arm adjoining said valve and affixed to said rocker arm at its fulcrum, whereby the angled lever arm and the rocker arm form a bell-crank and rocking of said rocker arm in a direction depending on which power cylinder is actuated.

CLIFFORD R. ROGERS.
WILLIAM O. BECHMAN.
JOSEPH F. ZISKAL.